United States Patent
Fox et al.

(10) Patent No.: US 9,595,022 B2
(45) Date of Patent: *Mar. 14, 2017

(54) COLLABORATION SWARMING

(75) Inventors: Andrew Fox, Sudbury, MA (US);
David Marshall LaPalomento, Lexington, MA (US); Ian Edward Roughley, Cambridge, MA (US); Scott A. Isaacson, Woodland Hills, UT (US)

(73) Assignee: Micro Focus Software Inc., Wilmington, DE (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/619,543

(22) Filed: Sep. 14, 2012

(65) Prior Publication Data

US 2013/0024419 A1 Jan. 24, 2013

Related U.S. Application Data

(63) Continuation of application No. 12/690,066, filed on Jan. 19, 2010, now Pat. No. 8,280,846.

(60) Provisional application No. 61/224,778, filed on Jul. 10, 2009, provisional application No. 61/236,005, filed on Aug. 21, 2009.

(51) Int. Cl.
*G06F 7/00* (2006.01)
*G06F 17/30* (2006.01)
*G06Q 10/10* (2012.01)

(52) U.S. Cl.
CPC ....... *G06Q 10/10* (2013.01); *G06F 17/30044* (2013.01)

(58) Field of Classification Search
CPC .. G06Q 10/10; G06Q 10/06; G06F 17/30011; G06F 17/3089; G06F 17/30867; G06F 17/30044
USPC ......................................................... 707/608
See application file for complete search history.

(56) References Cited

U.S. PATENT DOCUMENTS

| | | | |
|---|---|---|---|
| 7,764,701 B1 * | 7/2010 | Issa et al. | 370/408 |
| 7,831,928 B1 | 11/2010 | Rose et al. | |
| 8,280,846 B2 | 10/2012 | Fox et al. | |
| 8,898,282 B2 | 11/2014 | Fox et al. | |
| 2004/0261013 A1 * | 12/2004 | Wynn et al. | 715/511 |
| 2005/0089023 A1 * | 4/2005 | Barkley et al. | 370/352 |
| 2005/0114475 A1 * | 5/2005 | Chang et al. | 709/220 |
| 2005/0203851 A1 * | 9/2005 | King et al. | 705/51 |
| 2006/0173784 A1 | 8/2006 | Marples et al. | |

(Continued)

OTHER PUBLICATIONS

"About Google Wave—Home", [Online]. Retrieved from the Internet: <http:/wave.google.com>, (Accessed Jan. 27, 2010).

(Continued)

*Primary Examiner* — Jessica N Le
(74) *Attorney, Agent, or Firm* — Schwegman Lundberg & Woessner, P.A.

(57) ABSTRACT

A swarm can develop around a piece of content. The swarm can include the original content, changes to the original content, the persons contributing the changes, and metadata, such as comments contributed by members of the swarm. A swarm can also include statistics generated about the content, such as the size of the swarm, the growth and/or death rates of the swarm, the longevity of the swarm, the intensity of the swarm, the persistence of the swarm, and the direction of the swarm. Swarms and their behaviors can be used to validate or invalidate content.

10 Claims, 6 Drawing Sheets

(56) References Cited

U.S. PATENT DOCUMENTS

| | | |
|---|---|---|
| 2007/0113201 A1 | 5/2007 | Bales et al. |
| 2007/0150299 A1* | 6/2007 | Flory .................................. 705/1 |
| 2007/0226125 A1* | 9/2007 | Temte .................... G06Q 40/04 705/37 |
| 2007/0282887 A1 | 12/2007 | Fischer et al. |
| 2008/0133698 A1 | 6/2008 | Chavez et al. |
| 2008/0320087 A1* | 12/2008 | Horvitz et al. ............... 709/206 |
| 2009/0061825 A1* | 3/2009 | Neelakantan et al. ..... 455/412.1 |
| 2009/0083132 A1* | 3/2009 | Doganaksoy et al. .......... 705/11 |
| 2009/0092124 A1 | 4/2009 | Singhal et al. |
| 2009/0100128 A1 | 4/2009 | Czechowski, III et al. |
| 2009/0125413 A1 | 5/2009 | LeChevalier et al. |
| 2009/0182815 A1* | 7/2009 | Czechowski et al. ........ 709/206 |
| 2009/0198622 A1* | 8/2009 | Temte et al. .................... 705/80 |
| 2009/0259710 A1* | 10/2009 | Porio et al. .................... 709/201 |
| 2010/0023615 A1 | 1/2010 | Grigsby et al. |
| 2010/0121955 A1* | 5/2010 | Doganaksoy et al. ........ 709/226 |
| 2010/0257457 A1* | 10/2010 | De Goes ....................... 715/751 |
| 2011/0010335 A1 | 1/2011 | Fox et al. |
| 2011/0010421 A1* | 1/2011 | Chavez et al. ................. 709/204 |
| 2011/0010424 A1* | 1/2011 | Fox et al. ...................... 709/206 |
| 2011/0010638 A1* | 1/2011 | Fox et al. ...................... 715/752 |
| 2011/0153452 A1 | 6/2011 | Flinn et al. |
| 2013/0066673 A1* | 3/2013 | Rose et al. .................... 705/7.28 |
| 2013/0066864 A1* | 3/2013 | Rose et al. .................... 707/732 |
| 2013/0067357 A1* | 3/2013 | Rose ....................... G06F 3/048 715/760 |
| 2013/0290118 A1* | 10/2013 | Kast et al. ................. 705/14.73 |

OTHER PUBLICATIONS

"About Google Wave: How to Fix a Problem", [Online]. Retrieved from the Internet: <http://wave.google.com/help/wave/about.html#video>, (Accessed Jan. 27, 2010).

"DVD: About Google Wave", DVD Format, (May 28, 2009).

"FriendFeed is the easiest way to share online", [Online], Retrieved from the Internet: <http://friendfeed.com>, (Accessed Jan. 27, 2010), 30 pgs.

"Google Wave", http://support.google.com/wave/?hl=en, (2012).

"Swarm", Digg Labs, [Online]. Retrieved from the Internet: <http://labs.digg.com/swarm>, (Accessed Jan. 27, 2010), 3 pgs.

"What's This?", Digg Labs. [Online]. Retrieved from the Internet: <http://labs.digg.com>, (Accessed Jan. 27, 2010), 1 pg.

* cited by examiner

COLLABORATION SWARMING

RELATED APPLICATIONS

This application is a continuation of U.S. patent application Ser. No. 12/690,066, filed Jan. 19, 2010, now issued as U.S. Pat. No. 8,280,846, which claims the benefit of U.S. Provisional Patent Application Ser. No. 61/224,778, titled "COLLABORATION TOOLS", filed Jul. 10, 2009 and U.S. Provisional Patent Application Ser. No. 61/236,005, titled "PRESENCE-ENABLED INBOX", filed Jul. 10, 2009, which are all hereby incorporated by reference in their entireties.

This application is related to U.S. patent application Ser. No. 12/690,028 titled "AUTO-GENERATED AND INFERRED GROUP CHAT PRESENCE", filed Jan. 19, 2010, U.S. patent application Ser. No. 12/690,071, titled "INTELLIGENT CO-BROWSING AND CO-EDITING", filed Jan. 19, 2010, U.S. patent application Ser. No. 12/690,038, titled "UNIFIED ADDRESSING, SENDING, AND RECEIVING COLLABORATION SERVICE", filed Jan. 19, 2010, U.S. patent application Ser. No. 12/690,056, titled "UNIFIED EDITABLE INBOX", filed Jan. 19, 2010, and U.S. patent application Ser. No. 12/690,075, titled "PRESENCE-ENABLED INBOX", filed Jan. 19, 2010, all of which are commonly assigned with this application and are hereby incorporated by reference.

FIELD

This invention pertains to team development of content, and more particularly to the development of a swarm around content.

BACKGROUND

When people work together for any reason, they need to be able to share their thoughts with each other. Before everyone had a computer on his or her desk, this would involve circulating a paper copy of the materials, so that each person could comment on the materials. For example, one person would draft a document, and circulate it to the other members of the group. Each member would, in turn, read the document, add their comments, and make changes. But while the last person to review the draft would see the thoughts of all the other members of the group, the first person to review the draft would not have any insight into the thoughts of the other group members.

The introduction of desktop computers sped up this process, but did not otherwise enhance it. For example, the document could be circulated electronically, rather than on paper, with each person making changes and forwarding the electronic draft to the next person. The document could also be stored in a central repository (for example, on a disk on a networked server, that everyone could access), allowing the members to edit a single copy electronically at their convenience. This approach avoided toe problem of members having to wait until the draft was forwarded to them personally for review.

In fact, the use of computers might have encumbered the process. For example, the person who drafted the document could electronically forward it to each member of the team. Each team member could then review the draft and return their thoughts to the originator. But in this model, only the originator of the document saw everyone else's thoughts; no other members were privy to the thoughts of other members about the document.

Other electronic models have been developed that essentially mirror the "store and forward" model, but without requiring a set list of members. For example, computerized bulletin board systems allowed any person who could access the system to comment on anything within the system. These models have developed into modern tools, such as blogs and social networking systems like Facebook® and Twitter®. (Facebook is a registered trademark of Facebook, Inc.; Twitter is a registered trademark of Twitter, Inc.) But all of these models, like the original "store and forward" model, suffer from the same problems, in that they are somewhat one-directional and "call and response" in nature.

A need remains for a way to address these and other problems associated with the prior art.

SUMMARY

Content is developed by one user. Other users then can add additional information to the content, including changes and comments to the original content. A swarm can thereby develop around the content the swarm can include the content, the additional information provided by the various users, information about the users themselves, and information about the users' actions around that content.

The foregoing and other features, objects, and advantages of the invention will become more readily apparent from the following detailed description, which proceeds with reference to the accompanying drawings.

DETAILED DESCRIPTION

Figure 1:
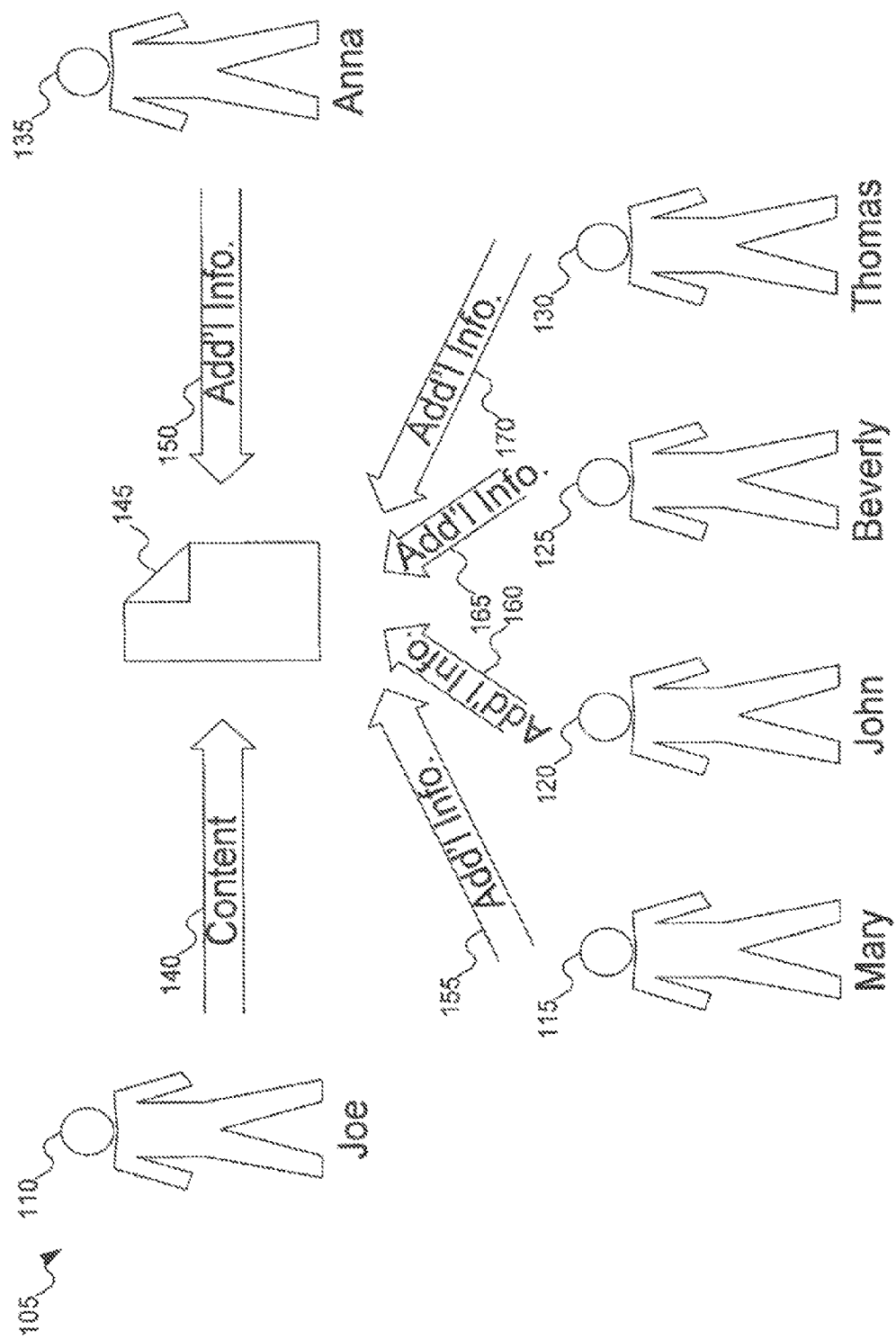
FIG. 1 shows a swarm developing around a piece of content, according to an embodiment of the invention.

FIG. 1 shows a swarm developing around a piece of content, according to an embodiment of the invention. In FIG. 1, swarm 105 is shown. Swarm 105 includes various users, such as Joe 110, Mary 115, John 120, Beverly 125, Thomas 130, and Anna 135. Joe 110 began the development of swarm 105 by posting content 140, which was the original version of content 145. As the other users contributed their additional information (150, 155, 160, 165, and 170), this additional content becomes part of content 145.

Swarm 105 starts as content 140, which Joe 110 posts in any desired manner. "Posting" can include e-mailing content 140 to users 115, 120, 125, 130, and 135, saving content 140 in a centralized location, informing users 115, 120, 125, 130, and 135 about content 140, blogging about content 140, putting content 140 on a social networking page, or using any other desired technique that alerts others about the existence of content 140, either passively or actively. ("Actively" informing others involves the recipients being made aware of the existence of content 140 as soon as it is posted; "passively" informing others involves the recipients somehow finding out about content 140 as a result of their own actions.) But as users 115, 120, 125, 130, and 135 add their information 150, 155, 160, 145, and 170 to content 145, additional information 150, 155, 160, 165, and 170 becomes part of swarm 105. In addition, swarm 105 includes users 110, 115, 120, 125, 130, and 135. In other words, the swarm includes the original content, the additional information, added by other users, information about the users themselves, and information about the users' actions around that content. A person of ordinary skill in the art will also recognize that Joe 110 can review additional information 150, 155, 160, 165, and 170 and, in response, provide some additional information himself. Thus, the originator of the content is not limited in his involvement as a member of the swarm to only providing the original content.

In contrast to prior art methods of sharing information, swarms can develop at "chat speed". That is, rather than one person generating content, forwarding that content to a second person who comments on it and forwards the content and comment to a third person, and so on, swarms can develop as quickly as participants in the swarm act. For example, when one user in swarm 105 comments on content 105, that comment is immediately accessible to the other members of the swarm, without having to wait for the comment to "circulate".

Swarms can be pushed content. Pushed content is content that is provided automatically to the user, without his having to actively retrieve the content. For example, most people use e-mail programs to retrieve their e-mails from a mail server. Every so often, the user can check to see if there is more e-mail, much like a person would have to walk out to his mailbox to see if any new letters had arrived. This technological model is called "pull technology", because the retrieval of the content is triggered by the client "pulling" in the content from its source. In contrast, "push technology" involves the content being received by the client at the behest of the source of the content. An example of "push technology" would be instant messaging programs, where the message appears on the user's computer as soon as it is sent by the originator: the user does not have to do anything to "retrieve" the message.

In addition to being pushed, swarms can be pushed at any speed. For example, a change in a swarm can be pushed to the other members of the swarm one character or attribute at a time. That is, every time an individual character or an attribute of the swarm is changed in the swarm, that change is pushed to the other members of the swarm. But if the demands on the system of pushing individual changes out to the members of the swarm are too great, changes can be pushed in larger intervals: for example, when a user completes a change (such as an e-mail message), or at regular intervals of time (such as every minute or every 10 minutes), if changes have been made since the last such push.

FIG. 1 suggests that original content 140 can be a document. But a person of ordinary skill in the art will understand that any type of content can be the start of a swarm. Aside from documents, other types of content that can develop into swarms can include messages (such as e-mail), instant messages accessible to the members of the swarm, images, audio and/or video files, and so on.

Although FIG. 1 shows six members of swarm 105, a person of ordinary skill in the art gill recognize that there can be any number of members in a swarm. Further, a person of ordinary skill in the art will recognize that swarm 105 can be controlled (that is, limited to only certain participants) or free-form (that is, open to anyone who wishes to view and comment on the content). Both types of forms have their benefits. Controlled swarms tend to stay focused on the topic of the content, and can develop significant additional content related to that topic. Free form swarms, on the other hand, can branch from one topic to another, identifying related topics of interest not directly addressed by the content.

Swarm 105 can be used to validate content 140. That is, based on additional information 150, 155, 160, 165, and 170 contributed by users 115, 120, 125, 130, and 135 content 140 can be considered to be accurate or inaccurate. For example, if additional information 150, 155, 160, 165, and 170 contributed by users 115, 120, 125, 130, and 135 indicates that the content 140 is not accurate, swarm 105 can be said to invalidate content 140. Content validation is discussed further with reference to FIG. 3 below.

Because the participants in the swarm are pan of the swarm, information about how the swarm develops can become part of the swarm. For example, the more relevant content is, the more action will be in the swarm around that content. And the more interesting the content is, the larger the swarm will be. Thus, statistics about swarm 105 can be useful and can become part of swarm 105. Statistics are discussed further with reference to FIG. 4 below. A person of ordinary skill in the art will recognize other metadata about swarm 105 that can also become part of swarm 105.

At some point, it might be useful to freeze swarm 105. Freezing swarm 105 prevents further changes from being made. Members of swami 105 can still review the content and the history of swarm 105, but they are prevented from making any further changes to swarm 105, including commenting on swarm 105 or editing content 145. Freezing swarm 105 might occur, for example, if it appears that swarm 105 has fully developed, and there is little benefit to permitting further activity within swarm 105.

Swarm 105 can be frozen manually. Which users (whether a member of swarm 105 or not) have the authority to freeze swarm 105 can be controlled by policies. For example Joe 110, as the user who posted content 140 that originated swarm 105, can have the authority to freeze swarm 105. Alternatively, another user, whether another member of the swarm or a third-party, can have the authority to freeze swarm 105, in addition, a person of ordinary skill in the art will recognize that pulley can grant multiple users the authority to freeze swarm 105; authority does not have to reside in only one user.

In addition, policy can permit a user to unfreeze swarm 105 after it has been frozen. This might be useful if, for example, it turns out that swarm 105 was frozen prematurely, before all the important contributions had been made. The policies controlling who can unfreeze a swarm can grant that authority to the same users who can freeze the swarm, or authority to unfreeze the swarm can be granted to other users. For example, authority to freeze the swarm can be granted to the user who originally created the content that triggered the development of the swarm, but authority to unfreeze the swami might be with that user's supervisor, to prevent the originator of the content from being able to block unwelcome contributions.

Swarm 105 can also be frozen automatically. Automatic freezing of the swarm can be triggered based on metadata about the swarm. Examples of possible triggers can include when activity begins to reduce, after the original content has been available for a threshold amount of time, after the swarm has had no activity for a threshold amount of time, when there is too much activity in the swarm, and so on. The statistics generated about the swarm, discussed below with reference to FIGS. 2 and 4, can be used to determine whether to automatically freeze the swarm.

Although FIG. 1 shows members of swarm 105 as being the only ones involved in swami 105, such is not a requirement of embodiments of the invention. For example, persons who are not members of swarm 105 can view content 145, without automatically becoming members of swarm 105.

Figure 2:
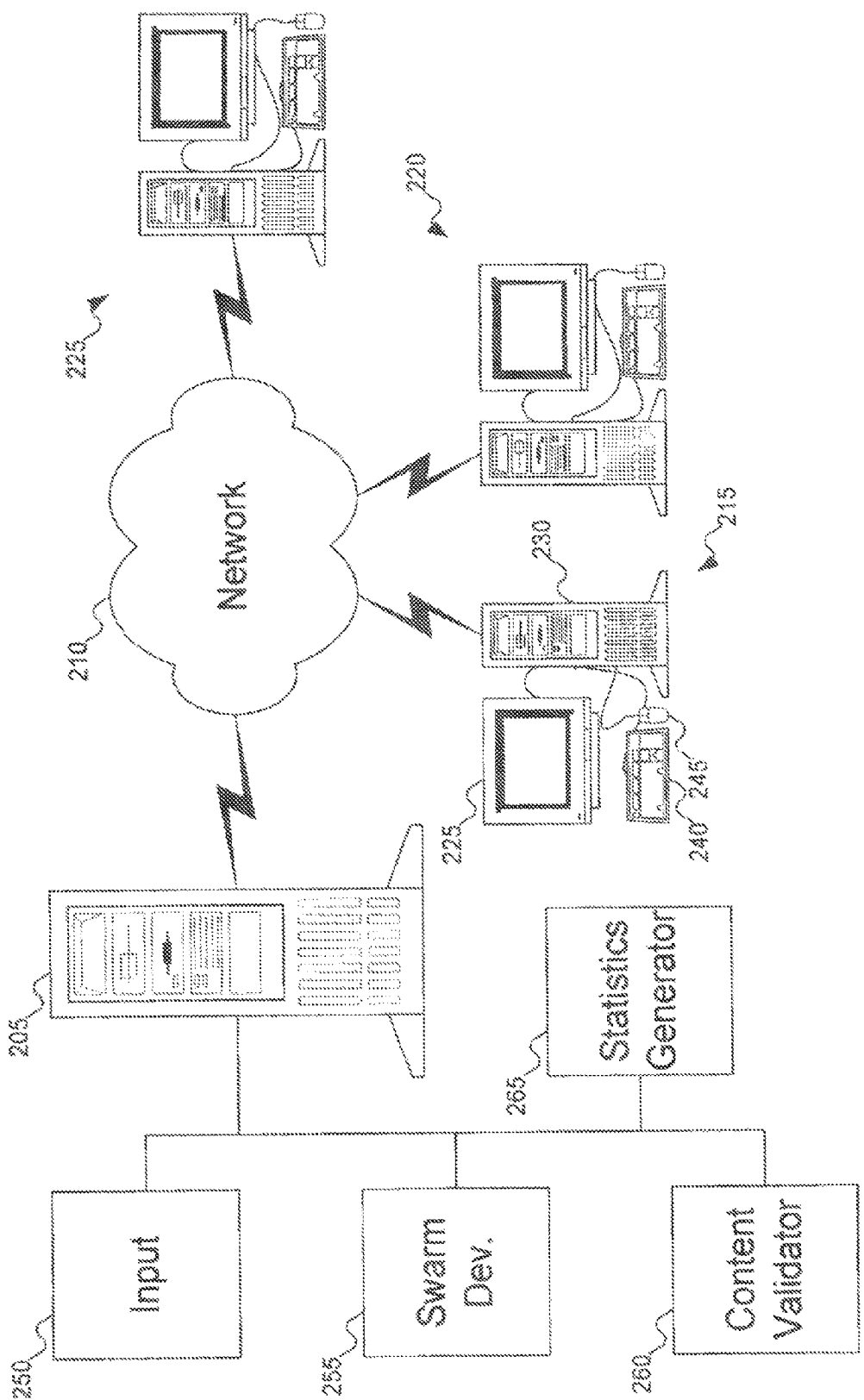
FIG. 2 shows a system to track the development of the swarm of FIG. 1.

FIG. 2 shows a system to track the development of the swarm of FIG. 1. In FIG. 2, machine 205 is shown. Machine 205 can be any machine capable of engaging in swarm management. Examples of forms machine 205 can take include servers, personal computers operated by a member of the swarm, and mainframes, among other possibilities. A person of ordinary skill in the art will also recognize that machine 205 can also take other forms, such as a personal digital assistant (FDA) or cellular telephone.

Machine 205 can be connected to network 210, which allows other machines, such as computer systems 215, 220, and 225 to interact with machine 205. Computer systems 215, 220, and 225 can be computers operated by other members of the swarm. Exemplary computer 215 can include computer 230, monitor 235, keyboard 240, and mouse 245. A person skilled in the at will recognize that other components not shown in FIG. 2 can be included with computer systems 215, 250, and 225; for example, other input/output devices, such as a printer. In addition, FIG. 2 does not show some of the conventional internal components of computer systems 215, 250, and 225; for example, a central processing unit, memory, storage, etc. Finally, although FIG. 2 shows computer systems 215, 250, and 225 as a conventional desktop computer, a person skilled in the art will recognize that computer systems 215, 250, and 225 can be also any type of machine or computing device capable of providing the services attributed herein to computer systems 215, 250, and 225, including, for example, a laptop computer, PDA, or a cellular telephone.

Network 210, which is shown as connecting machine 205 with computer systems 215, 220, and 225, can be any type of network. For example, network 210 can include a local area network (LAN), a wide area network (WAN), and the Internet, among other possibilities. A person of ordinary skill in the art will recognize that network 210 can also include combinations of different network types, and can include varieties of both wireless and wireline networks. In addition, while FIG. 2 shows three computer systems 215, 220, and 225 connected to network 210 (in addition to machine 205), a person of ordinary skill in the art will recognize that there can be any number of machines connected to network 210.

To support swarm management, machine 205 includes input 250, swarm developer 255, content validator 260, and statistics generator 265. Input 250 provides a way for machine 205 to receive information about the development of a swarm. For example, input 250 can receive the content from its originator, and additional information responsive to the content from the other members of the swarm.

Swarm developer 255 provides a way for machine 205 to develop the swarm. As discussed above, the swarm includes the original content, any additional information (including changes to the original content, comments about the original content, and other metadata) provided by members of the swarm, and the members of the swarm themselves. Swarm developer 255 tracks the activities that relate to the original content, and develops the swarm based on those activities.

Content validator 260 uses the swarm to validate the original content. As members of the swarm respond to the content and additional information, the swarm might move the focus from the original content into a new direction. If the direction of the swarm changes from the direction of the original content, this change in focus suggests that the original content was not valid. Conversely, if the swarm does not change the content from its original direction, the swarm can be said to have validated the original content.

Consider the following example. Assume that a particular original content suggests using an array as a data structure in a particular programming situation. After the swarm has partially developed, the swarm has changed the direction of the content toward using a linked list instead of an array. This change of focus can be interpreted as invalidating the original content.

Figure 3:
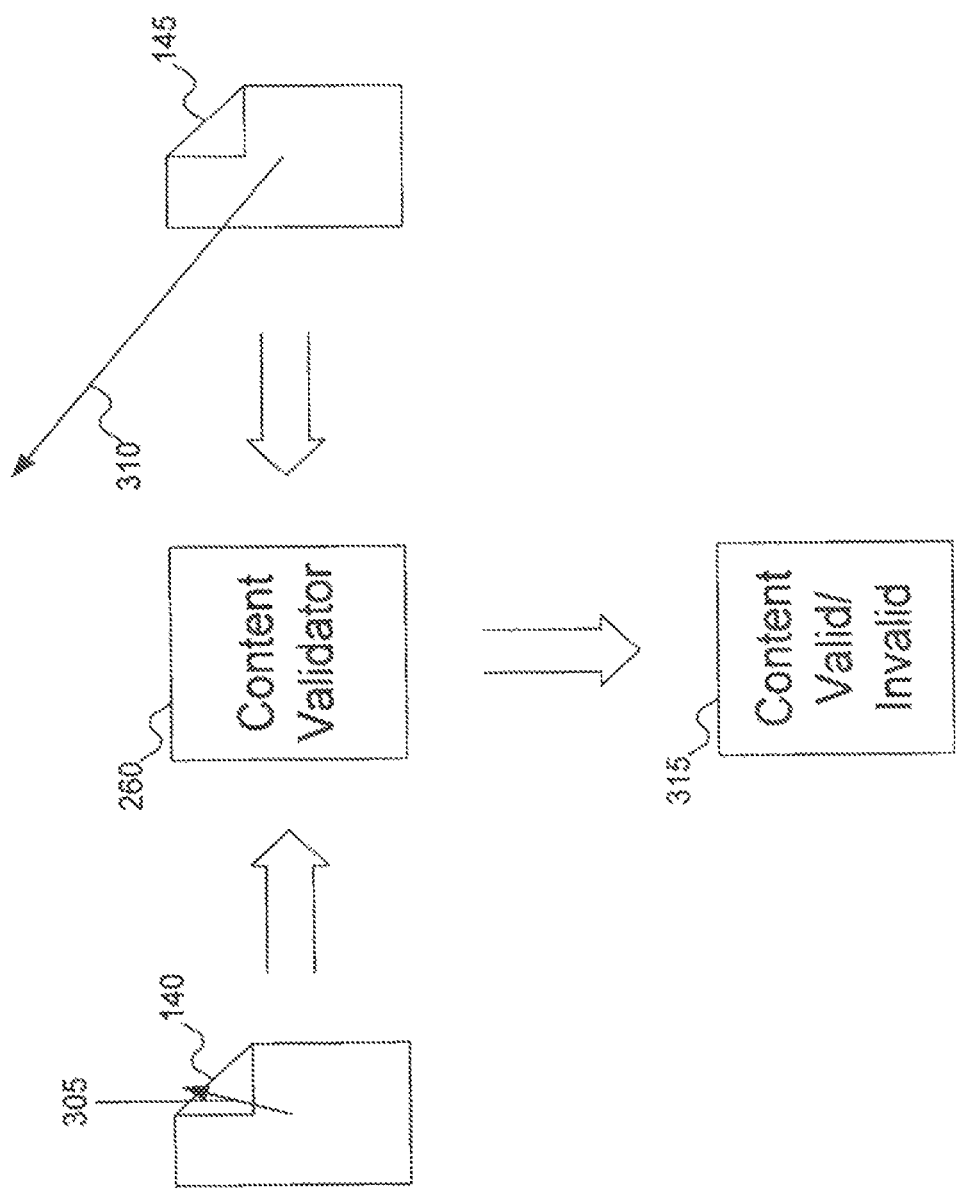
FIG. 3 shows the content validator of FIG. 2 validating content based on the swarm of FIG. 1.

FIG. 3 shows a graphical illustration of how the content validator of FIG. 2 can validate content based on the swarm of FIG. 1. In FIG. 3, original content 140 had a direction (angle and magnitude), shown by vector 305. In contrast, content 145 (the modified content after the swarm has developed) has a different direction (angle and magnitude), shown by vector 310. If the change in direction of the content, as represented by vectors 305 and 310, is significant, then content validator 260 can be interpreted, as invalidating the content, as shown by result 315. On the other hand, if the change in the direction of the content, as represented by vectors 305 and 310, is not significant, then content validator 260 can be interpreted as validating the content, as shown by result 315. The change in direction between the content 140 and 145 can be ascertained by measuring the angle and magnitude between vectors 305 and 310 using a common coordinate system.

One might wonder how content 140 and 145 can be represented as vectors 305 and 310, respectively. If the meaning of the terms in content 140 and 145 can be represented mathematically, one can construct vectors that represent the overall meaning of content 140 and 145, and then measure the change in direction of the contents. Examples of bow a direction of content can be ascertained can be found in U.S. patent application Ser. No. 09/109,804, titled "METHOD AND APPARATUS FOR SEMANTIC CHARACTERIZATION OF GENERAL CONTENT STREAMS AND REPOSITORIES", filed Jul. 2, 1998, now U.S. Pat. No. 6,108,619, issued Aug. 22, 2000, U.S. patent application Ser. No. 09/512,963, titled "CONSTRUCTION, MANIPULATION, AND COMPARISON OF A MULTI-DIMENSIONAL SEMANTIC SPACE", filed Feb. 25, 2000, now U.S. Pat. No. 7,152,031, issued. Dec. 19, 2006, U.S. patent application Ser. No. 09/615,726, titled. "METHOD AND MECHANISM FOR THE CREATION, MAINTENANCE, AND COMPARISON OF SEMANTIC ABSTRACTS", filed Jul. 13, 2000, now U.S. Pat. No. 7,197,451, issued Mar. 27, 2007, U.S. patent application Ser. No. 09/653,713, titled "INTENTIONAL-STANCE CHARACTERIZATION OF A GENERAL CONTENT STREAM OR REPOSITORY", filed Sep. 5, 2000, now U.S. Pat. No. 7,286,977, issued Oct. 23, 2007, and U.S. patent application Ser. No. 09/691,629, titled "METHOD AND MECHANISM FOR SUPERPOSITIONING STATE VECTORS IN A SEMANTIC ABSTRACT", filed Oct. 18, 2000, now U.S. Pat. No. 7,389,225, issued Jun. 17, 2008, all of which are commonly assigned with this application and are incorporated by reference herein. Another example of how a direction of content can be ascertained can be found in U.S. Provisional Patent Application Ser. No. 61/271,079, titled "ACTIVELY MANAGING DATA IN A COMPUTING SYSTEM ENVIRONMENT", filed Jul. 16, 2009, which is commonly assigned with this application and is incorporated by reference herein. A person of ordinary skill in the art will also recognize that there are other ways in which directions for content 140 and 145 can be ascertained and compared.

Figure 4:
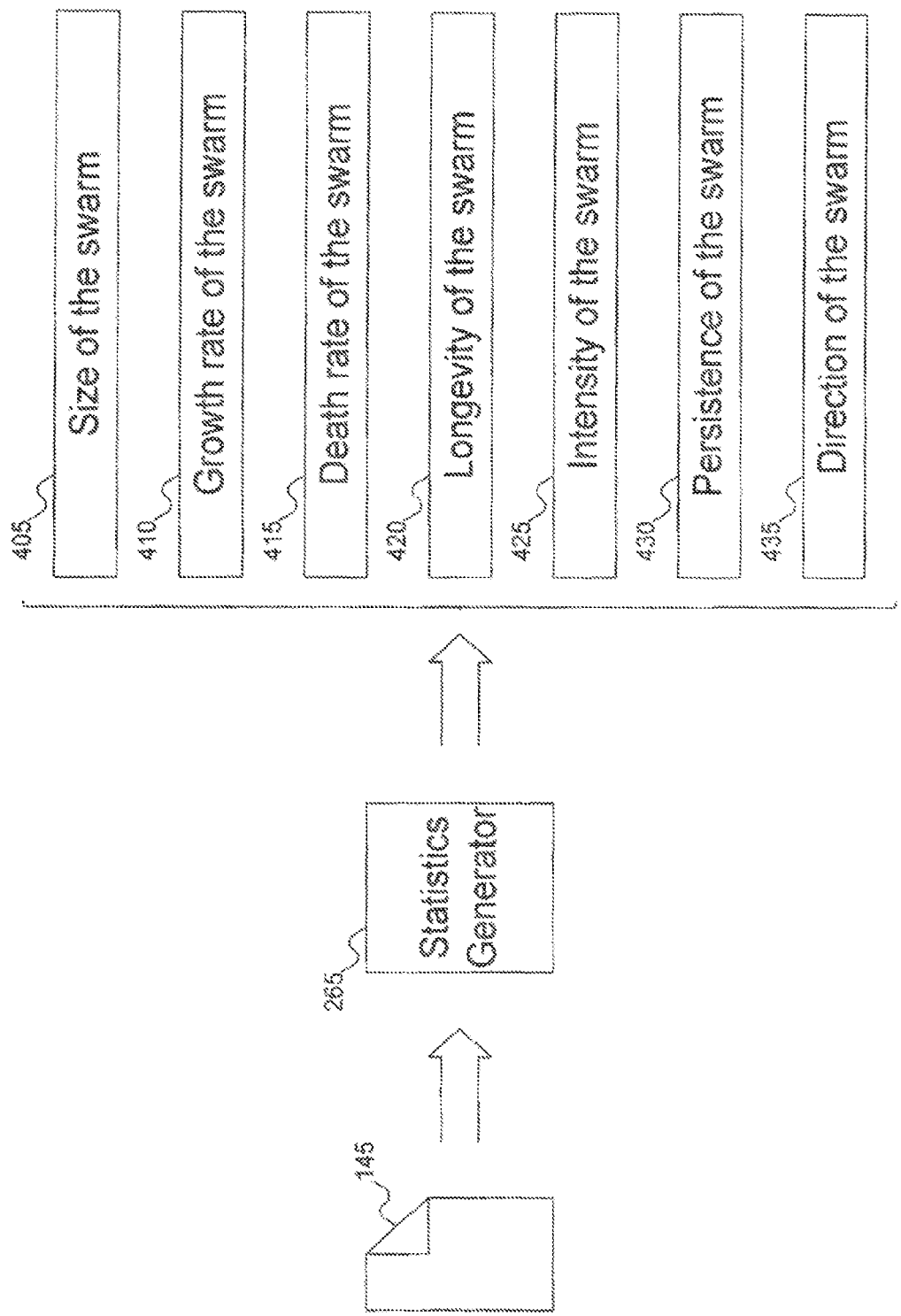
FIG. 4 shows the statistics generator of FIG. 2 generating statistics about the swarm of FIG. 1.

Returning to FIG. 2, statistics generator 265 generates statistics about the swarm. More detail about statistics generator 265 is shown in FIG. 4. Among the statistics that can be generated about a swarm are size 405 of the swarm (that is, the number of members in the swarm), growth rate 410 and death rate 415 of the swarm (that is, how the size of the swarm changes over time), longevity 420 of the swarm (that is, how long has the swarm been around), intensity 425 of the swarm (that is, how much activity there is in the swarm at any particular moment in time), persistence 430 of the swarm (that is, how long the swarm has had continuous activity), and direction 435 of the swarm. As discussed above with reference to FIG. 1, the statistics generated by statistics generator 265 can also become part of the swarm. The statistics generated by statistics generator 265 can be considered metadata for the content.

When a user interface is used to enable members of the swarm to use the content, the user interface can reflect the activity of the swarm. For example, color, size, motion, and audio and video segments can be used to reflect the state or the swarm. For example, as the swarm becomes more active, the amount of space in the interface devoted to the content can increase, as can the size of the font used. This increased size and font draws attention to the content, reflecting that the swarm is becoming more active. Or, color can be used to reflect the direction of the swarm relative to the direction of the original content. If the swarm has the same direction as the content, the content can be colored green; if the swarm starts to move in a different direction, the color of the content can shift to red, reflecting the changing direction of the swarm.

The user interface can also show the members of the swarm, so that individual members can see who else is in the swarm, in some embodiments of the invention. Individual members can also control whether their contributions to the swarm are editable. For example, one member can add a comment and flag that the comment cannot be edited.

Figure 5:
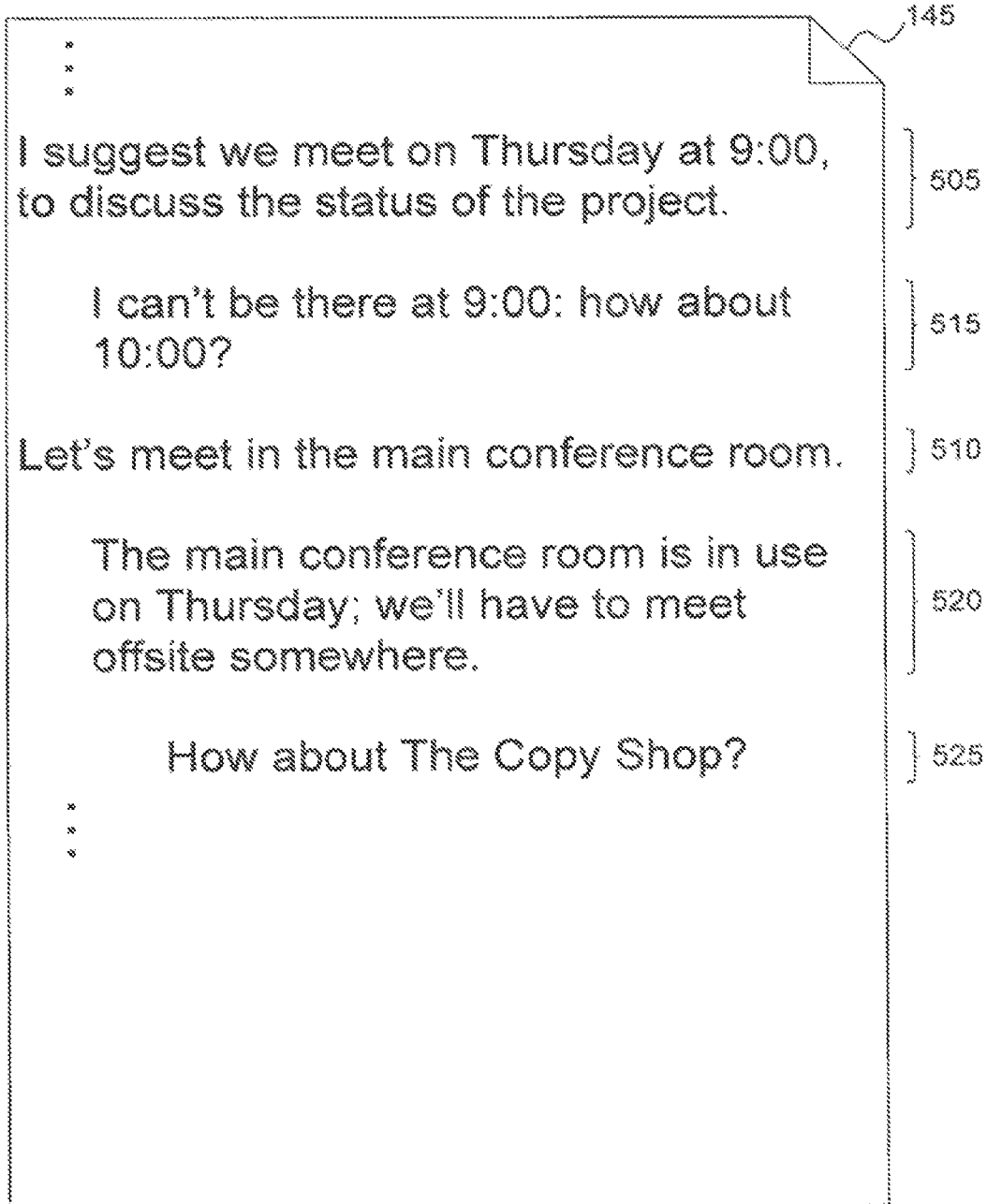
FIG. 5 shows the content of FIG. 1 being modified by other members of the swarm.

FIG. 5 shows the content of FIG. 1 being modified by other members of the swarm. In FIG. 5, detail about content 145 is shown. Content 145 includes original content 505 and 510, and additional content 515, 520, and 525. As can be seen from comments 505 and 510, the content originator had suggested a meeting at 9:00 am in the main conference room. Comment 515 suggested changing the time of the meeting to 10:00 am. Comment 520 suggested taking the meeting offsite, as the main conference room was not available; comment 525 suggested The Copy Shop for the meeting.

Given that comments 515, 520, and 525 were not part of the original content (as they were contributed by other users), a person of ordinary skill in the art will recognize that comment 510 originally followed comment 505; comment 515 was inserted later. Thus, comments 515, 520, and 525 were inserted inline into the original content. This shows that content developed by the swarm, rather than being simply "afterthoughts", can be put directly into the content, in an appropriate location. For example, it makes much more sense to include a request to change the time of the meeting (comment 515) directly alter the original time proposal (comment 505), than making the request later in the content.

Although FIG. 5 only shows comments being added, without changing the original content, a person of ordinary skill in the art will recognize that comments can actually edit the original content. For example, instead of comment 515 merely requesting a change in the time of the meeting, the contributor of comment 515 could have just edited the time in comment 505. In a similar manner, later comments can be edited. For example, instead, of adding comment 525, the contributor of comment 525 could have edited comment 520 to specify The Copy Shop as the place for the meeting.

But if content can be edited, how is a person reviewing the content to know what was the original content was and what was later added or edited? While comments 515, 520, and 525 can be indented to reflect their being later additions, a direct edit would not show any such indent. To allow swarm members to be able to locate what was changed, when, and by whom, the swarm can include a complete history of the content, tracking and storing what changes were made, when they were made, and by whom. By tracking and storing this information, members of the swarm can then replay the history of the swami, enabling the members to view what changed, when, and by whom. Members of the swarm can also filter the replay of the history, so that they can review only changes made during a particular time only changes made to a particular subset of the content, or only changes made by particular swarm members, among other possibilities.

Figure 6:
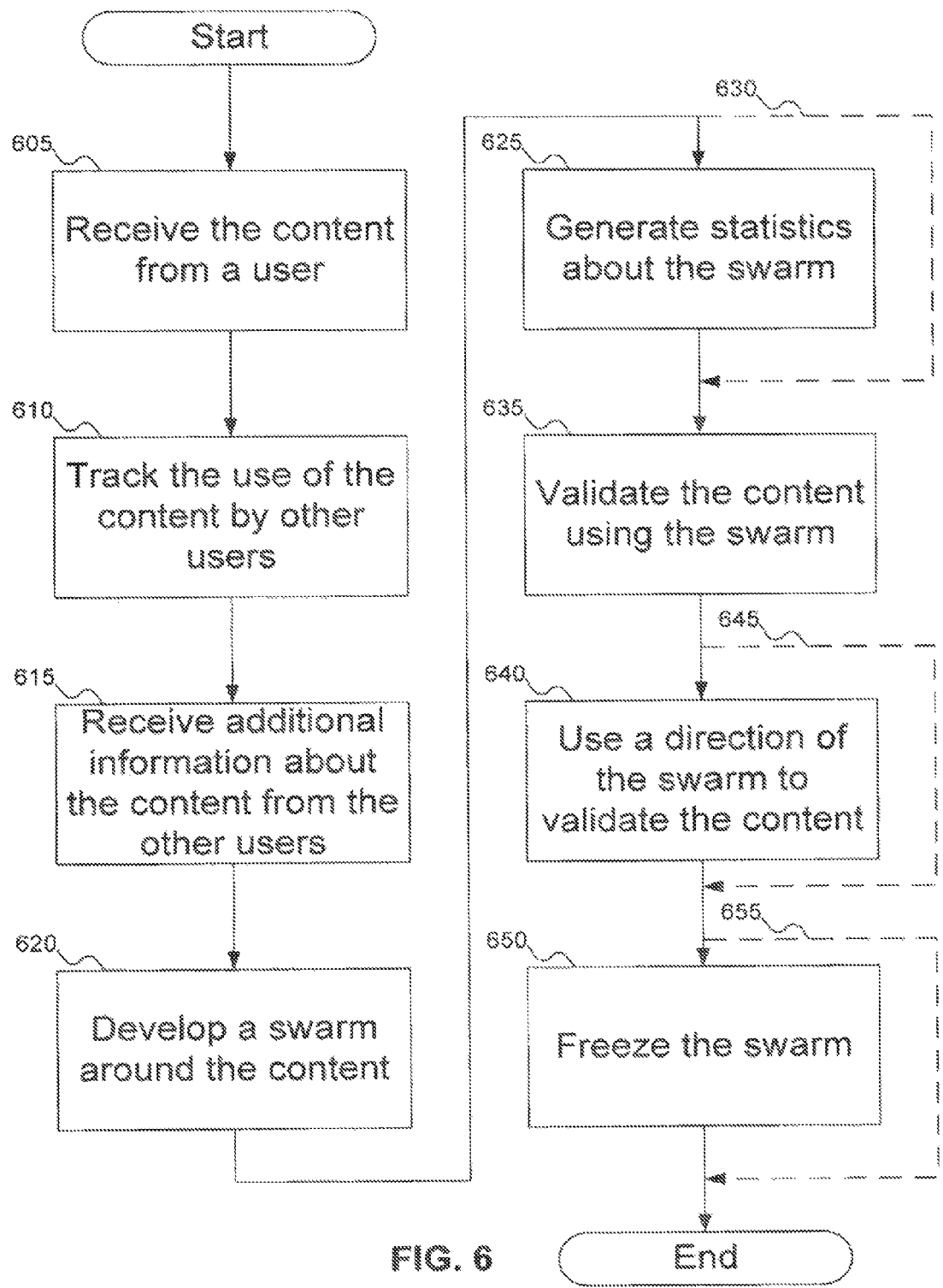
FIG. 6 shows a flowchart of a procedure for tracking the development of the swarm of FIG. 1, according to an embodiment of the invention.

FIG. 6 shows a flowchart of a procedure for tracking the development of the swarm of FIG. 1, according to an embodiment of the invention. At block 605, the system receives content from a user. AT block 610, the system tracks the use of the content by others. This "use" can include review of the content, the addition of comments, changing the content, and so on. At block 615, the system can receive additional information from the other users. At block 620, the system can develop a swarm around the content.

At block 625, the system can generate statistics about the swarm. Block 625 can be omitted, as shown by dashed arrow 630. At block 635, the system can validate the content using the swarm. At block 640, the system can use a direction of the swarm to validate the content. Block 640 can be omitted, as shown by dashed arrow 645. Finally, at block 650, the system can freeze the swarm, prohibiting further changes. Block 650 can be omitted, as shown by dashed arrow 655.

The following discussion is intended to provide a brief, general description of a suitable machine in which certain aspects of the invention can be implemented. Typically, the machine includes as system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through as network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined, in any desired manner. And although the foregoing discussion has focused on particular embodiments, ether configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

What is claimed is:

1. A method residing in a non-transitory computer readable storage medium for execution on a processor to perform the method, comprising:
   detecting, by the processor, content that is to be associated with a swarm;
   initiating, by the processor, the swarm for the content;
   tracking, by the processor, the swarm to record information regarding: the content, additional content provided by members of the swarm, member information for the members, and activity information for actions by the members on the content;
   recording, by the processor, statistics for the swarm, wherein the statistics for the swarm include one or more of: a size of the swarm, a growth rate of the swarm, a death rate of the swarm, an intensity of the swarm, a longevity of the swarm, a direction of the swarm relative to the content, and a persistence of the swarm;
   including, by the processor, the statistics as metadata for the content, wherein the metadata is part of the swarm;
   freezing, by the processor, the swarm to prevent changes to the swarm based on the metadata indicating that the swarm has a number of activities for a threshold amount of time and determined from the statistics; and
   unfreezing, by the processor, the swarm based on a request from a swarm user that is permitted by policy.

2. The method of claim 1 further comprising, using, by the processor, the swarm to validate the content.

3. The method of claim 1, wherein detecting further includes receiving the content from a particular member.

4. The method of claim 1, wherein detecting further includes finding the content being posted at a network site being monitored.

5. The method of claim 1, wherein recording further includes maintaining the statistics as one or more of: a total number of the members for the swarm, a growth rate for the swarm, a death rate for the swarm, a longevity rate for the swarm, an activity intensity rate for the swarm, a direction of the swarm, and a persistence rate for the swarm.

6. The method of claim 1 further comprising, invalidating, by the processor, a portion of the content, when a modification being attempted to the portion goes against a stated direction for the swarm.

7. The method of claim 1 further comprising, validating, by the processor the content based on a current direction of the swarm.

8. An article, comprising a non-transitory computer-readable storage medium, said storage medium having stored thereon executable instructions that, when executed by a machine, result in:
   identifying a piece of content associated with multiple members;
   tracking a development of the piece of content and actions of the multiple members;
   developing a swarm around the piece of content for the tracking;
   maintaining statistics for the swarm, wherein the statistics for the swarm include one or more of: a size of the swarm, a growth rate of the swarm, a death rate of the swarm, an intensity of the swarm, a longevity of the swarm, a direction of the swarm relative to content associated with the swarm, and a persistence of the swarm, and including the statistics as metadata for the content, and wherein the metadata is part of the swarm;
   freezing the swarm to prevent changes to the swarm based on the metadata indicating that the swarm a number of activities for a threshold amount of time and determined based on the statistics; and
   unfreezing the swarm based on a request from a swarm user that is permitted by policy.

9. The article of claim 8, wherein the identifying instructions further include receiving the piece of content from an initial authoring member of the content.

10. The article of claim 8, wherein identifying instructions further include automatically identifying the piece of content by detecting its presence on a network site or network service being actively monitored.

* * * * *